Figure 1:
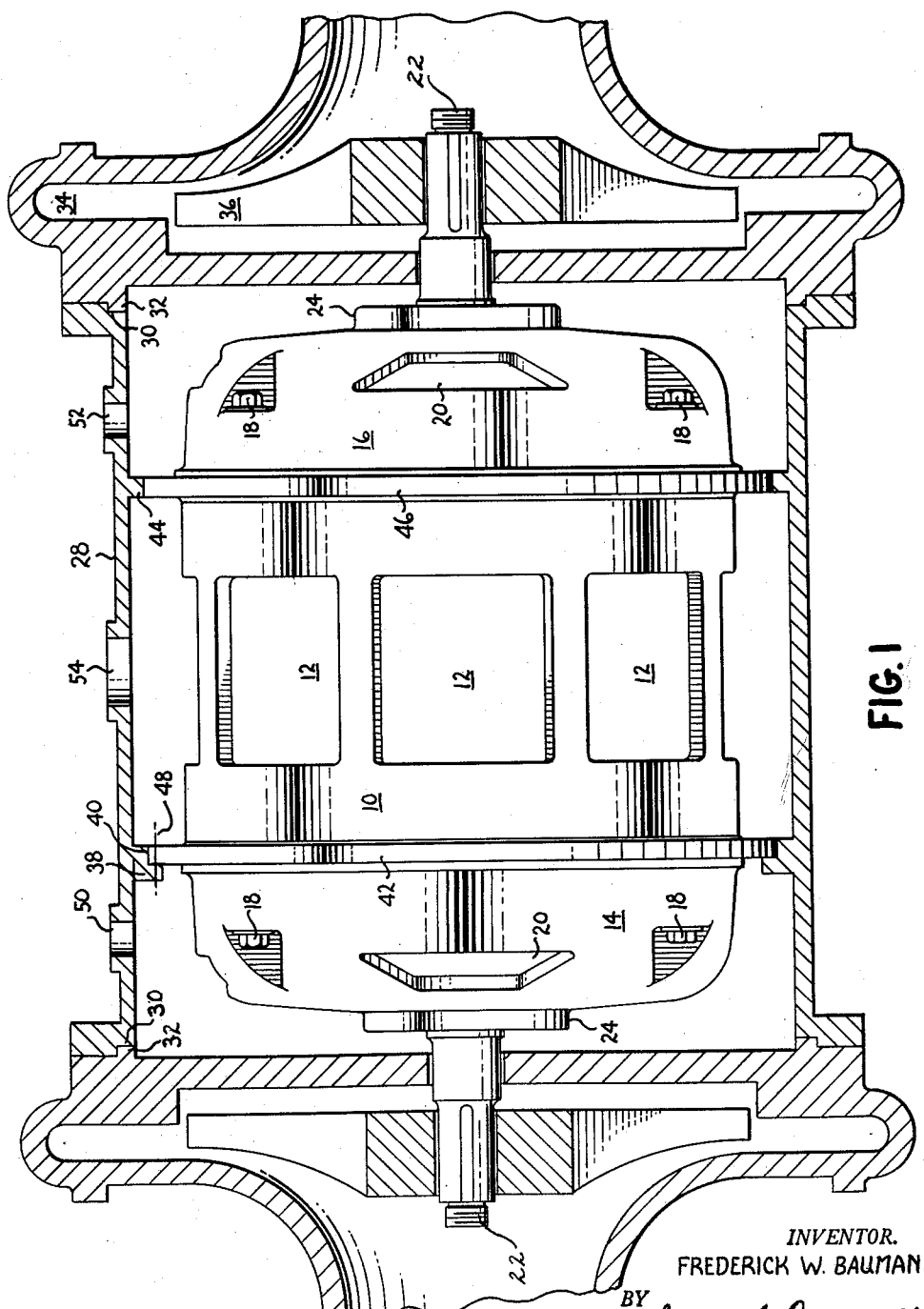

March 26, 1963   F. W. BAUMANN   3,083,308
HERMETIC MOTOR CARTRIDGE
Filed Jan. 6, 1961   2 Sheets-Sheet 1

INVENTOR.
FREDERICK W. BAUMANN
BY
ATTORNEY

United States Patent Office 3,083,308
Patented Mar. 26, 1963

3,083,308
HERMETIC MOTOR CARTRIDGE
Frederick W. Baumann, Scotia, N.Y., assignor to General Electric Company, a corporation of New York
Filed Jan. 6, 1961, Ser. No. 81,148
1 Claim. (Cl. 310—57)

The invention described herein relates to hermetic motors and more particularly to a hermetic motor cartridge adapted for use with refrigeration or air conditioning systems.

Hermetic motors conventionally utilize the refrigerant circulating in such systems or depend on water jacketed enclosures for carrying away heat generated by the motor during operation. The primary disadvantage of known constructions used for this purpose is that the motor frame or outer casing parts require such large diameters to permit a fluid-tight connection with the relatively large housing for the compressor that exceptionally large boring machines must be used, not only for milling the end surfaces but also for boring out the inside of the frame for accepting the stator core. Most manufacturing facilities are not equipped to handle the large size frames needed and therefore resort must be made to other manufacturers having equipment capable of performing these boring and milling functions. Not only is this an inconvenient practice but it also adds materially to the cost of the machine finally sold.

Another disadvantage relates to the problems of assembly in the factory and disassembly after the motor has been installed in a refrigeration or air conditioning system in the field. Disassembly after installation is particularly troublesome since any repairs to the motor usually will involve replacement of the motor bearings or windings. This usually requires complete dismantling of the motor and associated parts from the compressor with the attendant consequences of long shut down time and high costs to do the work. The problems associated with disassembly basically are caused by industry practices in which the motor manufacturer supplies the motor in accordance with one of two methods. Either the motor parts consisting of the stator and rotor without a frame are furnished for assembly into the compressor casing and onto the compressor shaft at the compressor manufacturer's plant, or, a complete motor including the hermetic casing is furnished by the motor manufacturer for bolting to the compressor casing. In the first instance, the compressor manufacturer is required to deal with motor parts which may not be in line with the skill of his craftsman, while in the second case, the motor manufacturer is required to deal with design and construction of the hermetic casing which normally would fall within the capabilities of the compressor manufacturer.

It therefore is evident that the need exists for a new design of hermetic motor and associated parts which will permit each of the motor and compressor manufacturers to contribute their particular skills to the combination of a motor and compressor used with refrigeration or air conditioning equipment.

The primary object of my invention is to provide a housing for a hermetic motor which will permit ready removability of a motor therein after it has been connected in a refrigerant system.

Another object of my invention is to provide a motor and housing construction such that each of the motor and compressor manufacturers can contribute their respective skills to the design and manufacture of a motor and a compressor.

Still another object of my invention is to provide a hermetic motor cartridge which will involve less cost to both the motor and compressor manufacturers who jointly contribute parts for use in a motor-compressor combination.

In carrying out my invention, I provide a cartridge especially designed for reception of a motor adapted for use in a refrigerant system. The cartridge completely encloses the motor, except for the ends which are attached directly to a housing enclosing the various stages of a compressor, and is equipped with gas inlets and an outlet at axially spaced points about the cartridge periphery. Cooperating positioning rings and flanges are provided on each of the inner walls of the cartridge and the outer frame of the motor for accurately locating the motor at all times within the cartridge.

Figure 2:
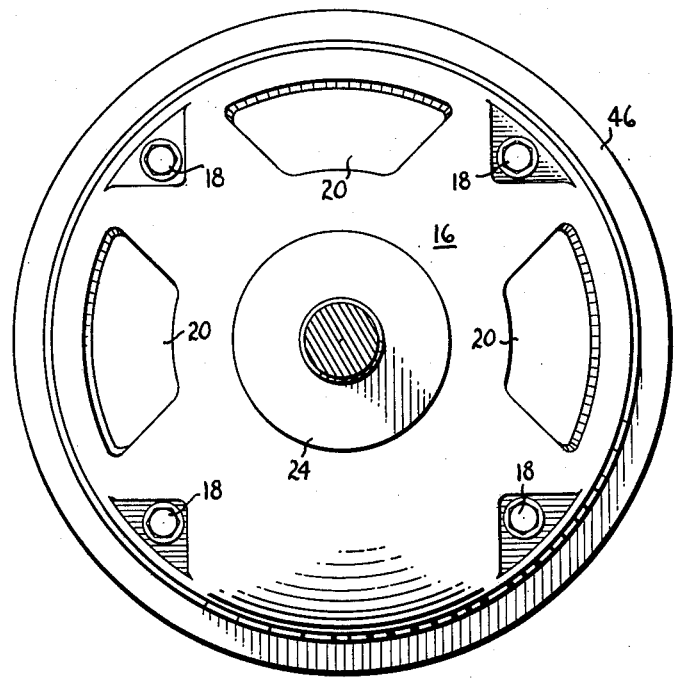

While the specification concludes with claims particularly pointing out and distinctly claiming the subject matter which I regard as my invention, it is believed the invention will be better understood from the following description taken in connection with the accompanying drawings in which:

FIGURE 1 is a sectional view in elevation, partly in section, illustrating the way in which a motor is mounted in a hermetic motor cartridge; and FIGURE 2 is an end view of the motor shown in FIGURE 1.

Referring now to the drawings wherein like reference characters designate like or corresponding parts throughout the several views there is shown a motor of conventional design comprising a rotor and a stator each having windings disposed therein in the usual manner. The stator core, now shown, is enclosed within the central portion of a frame 10 having ventilating openings 12 disposed around its periphery and providing access to the exposed surfaces of the stator punchings. End shields 14 and 16 are secured to opposite ends of the central frame by bolts 18 or other securing means. The end shields likewise are equipped with ventilating openings 20 which serve as an entry for the cooling medium into the inner confines of the motor for carrying out a cooling function. As shown, the motor shaft 22 is mounted in bearings 24 on opposite ends of the motor. Power to the motor is provided through motor leads, not shown, in a manner well known in the art. The motor thus far described is of conventional design and construction and, except for insulation on the windings which is compatible with freon gas, lends itself readily to the manufacturing facilities of most motor manufacturers. Different sizes of motor of substantially the same design therefore can be used in accordance with the demands of a particular refrigeration or air conditioning system which it is required to serve.

The improvement in this invention is that of providing a hermetic cartridge which will permit ready removal of the motor should repairs thereto be needed after it has been installed in a refrigerant system.

Referring more specifically to FIGURE 1 it will be seen that the cartridge comprises a cylindrical container 28 having appropriately formed machined end surfaces 30 adapted for coaction with correspondingly shaped flanges 32 formed on an end of a compressor casing. The compressor casing comprises several stages, one of which is indicated at 34 and which is designed to accept a compressor wheel 36 mounted on the motor shaft in the usual manner.

In order to impart removability features to the motor adapted for positioning within the hermetic casing, the inner surface of the casing is equipped with a flange 38 having a surface 40 machined on one side thereof for receiving the flat surface of a ring 42 integrally cast or otherwise formed on the peripheral surface of the motor frame. An additional coacting flange 44 on the casing and ring 46 on the motor are employed for accurately positioning the motor within the confines of the casing. It will be noted that a shoulder on flange 38 serves as a stop for limiting movement of the motor into the casing and also locates the motor in the casing, while the surface 40 on the other part of the flange centers the motor in the casing in the same manner as the coacting flange and ring 44 and 46. To firmly anchor the motor in position, the flange 38 is drilled and ring 42 tapped, and bolts 48 or other securing means used for securing the motor to the cartridge.

In order to provide for cooling of the motor, the cartridge casing is equipped with a pair of spaced inlets 50 and 52 and an outlet 54 located opposite the central portion of the motor. As previously indicated, the motor is provided with end shields 14 having openings 20 spaced around the axis which communicate with the inlets 50 and 52 and the closed cavities formed by the cartridge and the adjacent walls of the compressors. Since the coacting rings 42 and 46 and flanges 38 and 44 divide the cartridge into three separate chambers, the incoming gas is required to flow through the openings 20 to obtain access to the inner parts of the motor. The central portions of the motor frame has similar openings 12 from which the cooling gas flows prior to discharge out outlet 54. Both the inlets and the outlet are designed for connection to pipes or other fluid carrying devices which are arranged for connection at their other ends to either an evaporator or condenser, not shown, in the refrigerant system.

In operation, a refrigerant, preferably Freon gas, flows from the system into the cartridge through 50 and 52 preferably located at the top therof. The gas is required to enter the motor through openings 20 and then divides into a pair of parallel paths, one of which permits flow over the winding end turns and into that area between the motor frame and the laminated stator core prior to discharge through the outlet 54 in the motor frame. The other path, depending on the size of the machine being cooled, allows the refrigerant to flow axially into the rotor and radially across the air gap into the stator ducts, or into the air gap directly before being discharged through openings 20 into the space between the motor frame and the inner portions of the cartridge before being pumped through the cartridge outlet 54. The above described flow paths are conventional for this kind of machine and does not constitute a part of this invention. Obviously, any kind of flow path may be used for passing the Freon into heat exchange relationship with the heat producing parts in the motor. For example, a plurality of gas inlets, instead of a single one, could be located around the cartridge at one end for permitting introduction of the required volume of gas for flow axially through the machine prior to discharge out the other end of the cartridge. Also, the gas flow in the circuit shown in FIGURE 1 may be reversed if desired. The outlet 54 then would become an inlet and the inlets 50 and 52 would become outlets for the refrigerant. Successful performance of a motor having this reversed arrangement of inlet and outlets in the cartridge has been obtained.

In some modifications it may be preferable to locate the rings 42 and 46 on the end shields instead of on the frame of the motor. Also, the rings need not be continuous but may be broken along their length.

Although the above description illustrating the invention has been directed specifically to a hermetic motor cooled by a refrigerant circulated through the system, it will be apparent that the teachings are equally applicable to the use of other types of cooling mediums. For example, composite insulations on the motor coils which permit high pressure water to flow in contact with the windings during operation are now well known, and it is evident that such insulations may be used in a motor adapted for installation in the cartridge. The water then would serve the same function as the refrigerant in carrying away heat generated by the motor during operation. Substantially the same flow paths could be used including the modifications suggested above. Motors having the stator winding encapsulated with insulating materials also may be used.

Alternatively, in lieu of having the cooling medium in intimate contact with the windings, the motor could be provided with a double shell, as in conventional constructions, in which passageways are formed for permitting water or other cooling medium to flow for absorbing the heat of the motor. This kind of construction would not detract from the important feature of removability of the motor including its attendant advantages.

The principal advantages derived from the construction disclosed herein is that the motor is made readily detachable thereby permitting a craftsman to remove it conveniently and disturb fewer other parts of the refrigeration system when repairs are necessary. This substantially reduced the prior art problems of assembly and disassembly in both the factory and in the field. Also, it is now possible to utilize a more nearly conventional motor without resorting to special constructions which heretofore was necessary. Still another important factor is that the motor manufacturer provides the motor and bearings which are in line with his normal technology while the compressor manufacturer deals with the cartridge and those other elements which fall within his normal areas of technology. Because these practices can now be carried out, the overall costs to each of the motor and compressor manufacturers are reduced thus providing economy in the manufacture of a complete refrigeration or air conditioning system.

In view of the above it will be apparent that many modifications and variations are possible in light of the above teachings. It therefore is to be understood that within the scope of the appended claim the invention may be practiced other than as specifically described.

What I claim as new and desire to secure by Letters Patent of the United States is:

A cartridge for enclosing a refrigerant cooled motor comprising a cylindrical casing open at its ends, a pair of spaced motor centering flanges projecting inwardly from the casing inner walls and adapted for coaction with cooperating rings formed on a motor frame surface, one of said flanges being equipped with a shoulder for limiting axial movement of the motor into the casing, a pair of refrigerant inlets each being formed in the wall of said casing and respectively located axially outward from each of said flanges, and an outlet in the wall of said casing positioned between said flanges, the arrangement being such that said flanges cooperate with rings on a motor adapted for placement in said casing to form inlet and outlet chambers useful in controlling the direction of refrigerant flow in the casing.

References Cited in the file of this patent

UNITED STATES PATENTS

| | | |
|---|---|---|
| 1,175,977 | Nolan | Mar. 21, 1916 |
| 1,244,344 | Ilg | Oct. 23, 1917 |
| 1,484,962 | Randle | Feb. 26, 1924 |
| 1,521,359 | Costa | Dec. 30, 1924 |
| 2,266,107 | Waterfill | Dec. 16, 1941 |
| 2,372,749 | Taylor | Apr. 3, 1945 |
| 2,726,807 | Lewis | Dec. 13, 1955 |
| 2,746,269 | Moody | May 23, 1956 |

FOREIGN PATENTS

| | | |
|---|---|---|
| 266,942 | Italy | Aug. 19, 1929 |